Sept. 12, 1944.   J. FISCHER   2,357,815
AUTOMOTIVE FIXTURE OR ACCESSORY
Filed Nov. 23, 1938
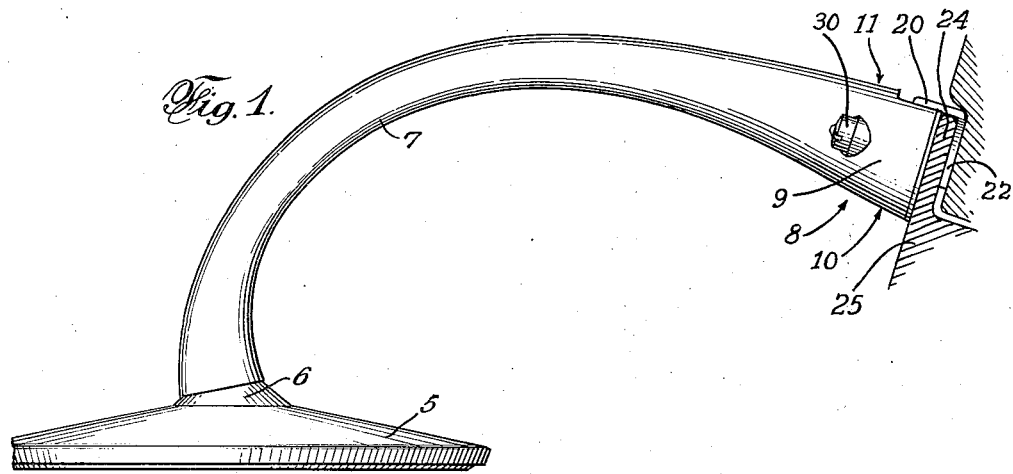
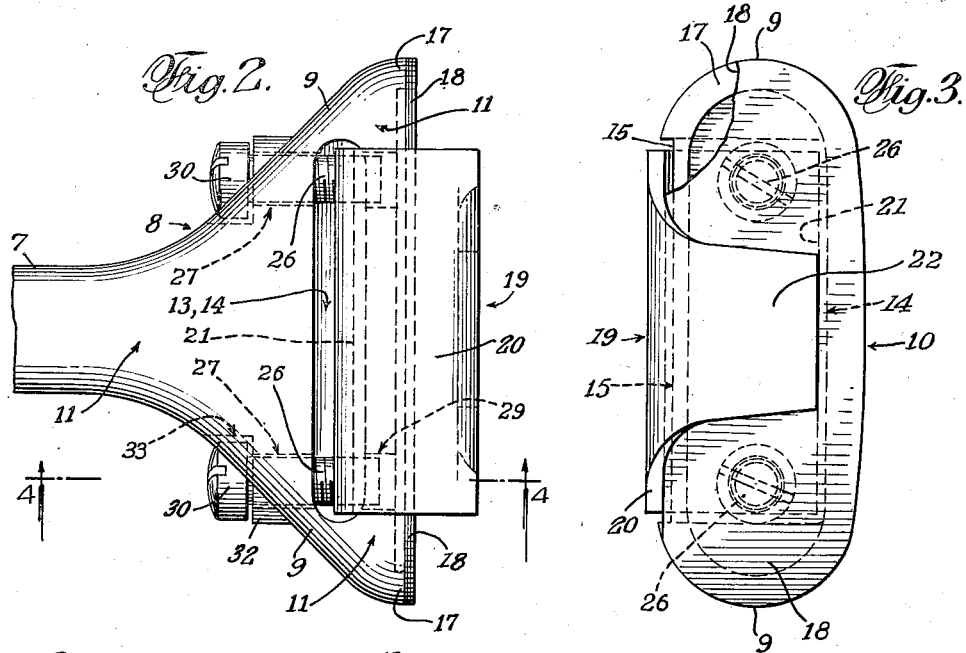
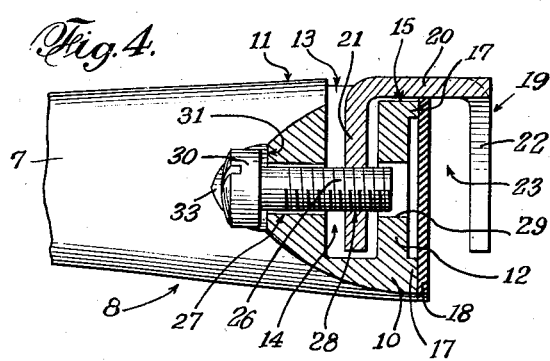
INVENTOR
Joseph Fischer
BY
Lemlein & Moldy
ATTORNEYS Patented Sept. 12, 1944

2,357,815

UNITED STATES PATENT OFFICE 2,357,815

AUTOMOTIVE FIXTURE OR ACCESSORY

Joseph Fischer, New York, N. Y.

Application November 23, 1938, Serial No. 241,974

12 Claims. (Cl. 248—226)

My present invention relates to rear vision mirror brackets and the like or in general to automotive accessories in aid of safety and comfort in motoring, and provides a device of the general character indicated which is simple in construction, easy and economical to produce and which presents a pleasing appearance when affixed to a motor vehicle or other support.

An object of the invention is to produce a new form of automotive fixture or accessory, adapted for installation on the marginal flange of a vehicle door or the like, having a new housing construction including a clamping member which performs a space-closing function, the clamping member being movable in relation to both the car door and the housing and operable from the outside of the door for engagement directly against the inner surface of the door flange to draw said fixture into directly seated engagement with the outer surface of said flange, thereby avoiding the existence of an unsightly open space or ragged-edge fit where the fixture joins the door, and which can be attached to a car without drilling or making other alterations when installing the fixture in service position in the rather limited space available on a standard automobile door.

In the accompanying specification, I shall described and in the annexed drawing show an example or one form of construction based on the principle of the invention. It is however to be clearly understood that I do not wish to be limited to the exact details of construction herein shown and described for the purpose of illustration only inasmuch as changes may be made therein without departing from the spirit and principle of the invention.

In the accompanying drawing,

Fig. 1 is a top plan view showing a mirror bracket embodying the invention and mounted on the closed door of a vehicle.

Fig. 2 is an enlarged fragmentary front view of the attaching means of the accessory device.

Fig. 3 is a view of the bottom of the fixture which seats jaw-fashion against the door surface, a portion of its pad or gasket being broken away; and Fig. 4 is a transverse sectional view taken on line 4—4 of Fig. 2.

Referring now more in detail to the drawing, the numeral 5 designates an automotive accessory such as a rear view mirror carried on a ball-and-socket joint 6 at the outer end of a curved supporting bracket or arm 7. The inner end of the bracket 7 broadens or flattens out to form a clamping jaw bottom surface on a substantially elliptical casing 8 in the shape and form of an elongated housing. This example of the invention shows the bracket arm 7 cast integrally and merging with the housing 8 in a tapering streamline contour, as one form of the accessory manufactured for the trade.

The casing 8 consists generally of diverging outer or end housing walls 9, rear wall 10, and a front wall 11. The casing 8 may also include a bottom or inner wall 12 set inwardly of the casing. Also a front wall 11 is provided with an opening 13 lengthwise thereof which communicates with a space or housing recess 14 to form an elongated interior chamber. Thus the present housing 8, among other things, opens along its front side 11, near the bottom thereof, as shown at 13 in Figs. 2 and 4.

The forward surface 15 of the casing 8 lies in a plane below that of the front wall 11, and a marginal bottom flange or rim 17 forms a part of the housing and constitutes the jaw clamping or pressing surface thereof. The bottom of the housing may be covered with a layer 18 of felt or other protecting material forming a gasket to bear against the outer surface of the car door to avoid marring the door finish when the bottom or jaw rim 17 of the housing clamps thereagainst.

Cooperable with the casing 8, so as to attach the bracket 7 to the door of a motor vehicle or to any other support, is a clamping member illustrated in the form of a hook-like yoke or a two legged strap means 19 substantially U-shaped in cross-section and which includes a yoke front portion 20 of about the same length as the elongated interior 13, 14 of the housing. This yoke front side 20 is slidably associated with and guided by the forward surface 15 of the housing 8. The arrangement of the structural parts herein is such that the outer surface of the yoke front portion 20 is flush with the outer surface of the front wall 11 of the casing 8. This provides a straight front on the device and adapts it to a flush linear fit with the edge of the car door, and is one of my preferred constructions.

Formed with the yoke front integral portion 20 is an operating flange or arm 21 bent at right angles to and which may be about the same length as said yoke portion 20. The operating arm 21 also may be about equal in length to that of the interior space 13, 14 of the casing and extends thereinto. Also formed with the yoke portion 20 is a gripping arm flange or inner clamping jaw 22 bent at right angles to said portion 20 and presenting, between itself and the bottom rim 17 of the casing, a space 23 for receiving the flange 24 of the door 25 of a motor vehicle or the like. Although the clamping jaw 22 is outside of and spaced from the housing 8, I have designated this portion 22 as the inner jaw since it is adapted to engage the inner surface of the car door.

In order to operate the new device and firmly grip the door flange 24, I provide means for moving the inner jaw or gripping arm 22 toward the bottom rim 17 of the casing 8. Such means includes screws 26 spaced apart which pass freely through non-threaded openings 27 in the end walls 9 of the casing and screwed into threaded openings 28 in the operating arm 21 of the strap 19. The inner ends of the screw means 26 may stop short of the felt covering or gasket 18 and may be accommodated in openings 29 formed in the inner wall 12 in registry with the openings 27 of the walls 9.

The heads 30 of the screws 26 bear against and react from the outer flat surface 31 of the housing 8, or of its bosses 32, and turn freely in recesses 33, in order to actuate the operating arm 21 relatively within the housing. This action draws the inner clamping jaw 22 toward the bottom 17 of the housing to close in on and reduce the clamping space 23, thereby forcing the two jaw means 8 and 22 toward each other.

The strap or yoke-like clamping member 19 is associated with the casing 8 of the bracket 7 by inserting the arm 21 through the opening 13 in the front wall 11 of the casing and into the elongated interior 14 thereof. The screws 26 are then passed through the non-threaded openings 27 in the walls 9 and are screwed into the threaded openings 28 of the arm 21.

With the door 25 in open position, the strap 19 is straddled over the door flange 24 so that the front portion 20 of the yoke abuts the edge of said flange, and the jaw 22 is adjacent the inner surface of the flange. Thereafter the screws 26 are tightened to move the operating arm 21 and hence the jaw 22 toward the bottom of the housing, thus firmly gripping the door flange 24 within the space 23. Accordingly, when the car door 25 is locked closed, the mirror bracket or other accessory cannot be removed and hence is theft proof.

The structural relations locate the elongated straight front yoke portion 20 in movable engagement with the front of the housing 8 and, with the latter, form a straight front on the door accessory. Likewise, the yoke 19 has its front wall portion 20 arranged to substantially close the front opening 13 of the interior housing space 14 when the fixture is mounted in finally tightened position on the car door. These structural relations also result in minimizing the overhang of the front side of my accessory at the door edge where the stationary door jamb of the car body is very close to the edge of the swinging door. This advantage is derived by so designing the yoke front side portion 20 and front side 11 of the housing 8 that they combine to form the front of the device and impart to the latter a reduced structural thickness at such front to give it flush alignment with the linear edge of the door flange 24. This particular form of my construction, therefore, has the advantage of fitting into the extremely limited space available between the door jamb and swinging door and prevents the fixture from striking and marring the door jamb in the body of the car.

From the foregoing it will be seen that the housing or casing 8 partially encloses the movable yoke 19 and that the latter operates in relation to the housing when adjusting and tightening this new automotive accessory on the car door flange 24. The bottom 17 of the housing and/or its gasket 18 seats against the outer surface of the door flange, and the inner jaw arm 22 of the movable yoke 19 forceably draws toward the inner surface of the door to clampingly engage same. It follows, therefore, that the bottom of the housing effects a space-closing seating function against the outer surface of the door, and has the appearance of integrally merging therewith.

The hook-like yoke 19 of single-piece construction is important in attaining the characteristic mode of operation herein. The front portion 20 of the yoke is about equal to the length of the housing chamber or interior space 13, 14. This front side 20 is imperforate, while its operating arm 21 is provided with a threaded aperture or apertures 28 to receive screw means 26 required for operating this member relatively within the fixture housing. This yoke 19 forces the bottom of the housing 8 to seat and seal jaw-fashion against the outer door surface and has the appearance of streamlining thereinto. At the same time, the front side 20 of the yoke occupies or fits into the front side of the housing and closes its front bottom by straddling the door flange 24.

In particular, the foregoing accessory fixture and its new mode of operation is an improvement upon my former Patent 2,121,144 and other like prior devices heretofore on the market not embodying the advantages of the hook-like yoke clamping member 19 with its integral front portion 20 movable relatively within and at the front of the housing. Such prior automotive accessories, when clamped on the margin of the door flange, cause a space to open up between the housing and the outer door surface, thus presenting a ragged-edge open-space fit of unfinished appearance. Such prior devices also lack rigidity against vibration due to the fact that the housings thereof do not seat against and brace from the door surface, but pull away therefrom.

This invention is presented to fill the need for a useful automotive fixture or accessory. It will be understood how various modifications in construction, mode of operation, use and method, may and often do occur to others, especially so after benefitting from knowledge of an invention. Accordingly, this disclosure is exemplary of the principles of the invention and its equivalents without being limited to the present showing thereof.

What I claim as my invention is:

1. An automotive fixture comprising, in combination, a housing adapted to have direct engagement against the outer surface of a car door, and a bracket arm extending outwardly from the housing to mount an accessory in service position on said door, a clamping member having a portion thereof mounted movably within the housing, a jaw carried by the clamping member and adapted to engage the inside surface of said door flange, and screw means carried by the housing and having operative connection with that portion of said clamping member which is within the housing for drawing it and the jaw relatively toward each other, whereby the housing clamps directly against the outer surface of the door in a space-closing manner, and the jaw grips the inside of the door flange.

2. An automotive fixture comprising, in combination, a housing adapted to have direct engagement against the outer surface of a car door, and a bracket arm extending outwardly from the housing to mount an accessory in service position on said door, a clamping member adapted to reach around the flange of the car door, a jaw formed on the clamping member and adapted to engage the inside surface of said door flange, said clamping member being operatively carried with the housing for movement in relation thereto, and screw means carried by the fixture in operative relation with the housing and the clamping member for drawing said housing and said jaw relatively toward each other, whereby the housing clamps directly against the outer surface of the door in a space-closing manner, and the jaw grips the inside of the door flange.

3. An automotive fixture comprising, in combination, a housing adapted to seat against the outer surface of a car door, and a bracket arm extending outwardly from the housing to mount an accessory in service position on said door; a clamping yoke adapted to straddle the flange of the car door and operatively associated with the housing for movement in relation thereto, said yoke including a jaw disposed outside of the housing and reaching behind the door flange; and screw means carried by the fixture and operatively associated with the housing and with the clamping yoke for drawing said housing and the jaw relatively toward each other, whereby the housing clamps against the outer surface of the door in a space-closing manner and the jaw grips the inside of the door flange.

4. An automotive fixture comprising, in combination, a housing adapted to engage the outer surface of a car door flange, a bracket arm extending therefrom on which a car accessory is mounted; a hook-like yoke straddling the door flange and movable in relation to the housing, said yoke including a jaw portion reaching around the door edge into clamping position behind the door flange, and also including an operating portion disposed within the housing; and screw means carried by the fixture in operative relation with the housing and with the hook-like yoke, including a threaded rotatable member having one end bearing against the housing, for actuating the operating portion relatively within said housing, thereby drawing the jaw portion and housing toward each other to clamp said housing against the door flange in a space-closing manner.

5. A clamp and bracket fixture for mounting an automotive accessory in service position, especially on the edge of a car door flange, comprising in combination; an arm for supporting such accessory, a housing from which the arm extends, the housing having end walls and a rear wall as well as a front side, together with bottom means adapted to clampingly press toward the outer surface of the door flange; a hook-like yoke having an operating portion joined by a front integral portion to a clamping jaw, the operating portion mounted within the housing and the clamping jaw mounted outside thereof beyond the bottom means, the yoke also having its front integral portion movably cooperating with the front side of the housing and being adapted to straddle the door flange for abutting said front integral portion against the linear edge of said flange, thereby disposing said flange between the bottom means and the clamping jaw; and screw means cooperatively associated with the housing and the operating portion of the yoke for drawing the bottom means and the clamping jaw toward each other, thus gripping both surfaces of the straddled door flange, and closing all space around the housing between its bottom means and the surface of said flange.

6. An automotive fixture and clamping device comprising, in combination; an arm carrying an accessory at one end thereof and a housing disposed at its other end, the housing having an opening of general rectangular form at its front side; a yoke of hook-like form in cross section adapted to straddle a car door flange, and having an elongated flat straight front side the inner surface of which is adapted to engage the linear edge of said car door flange, also having a clamping jaw engaging the inside surface of said door flange, and having an operating portion outside said door flange movably received into the front opening of the housing, the elongated flat straight front side of the yoke having its outer surface fitted flush with and forming a portion of the front side surface of the clamping device, and the entire front side of the yoke being exposed to view in the front opening of the housing, whereby the device is adapted to fit into a space of minimum clearance between the swinging door edge and the stationary door jamb of a car body without striking and marring said door jamb; and screw means operatively asssociated with the housing and the yoke for drawing them toward each other to grip the door flange therebetween, thereby clamping said housing against the outer surface of said door flange, in a space-closing manner, and anchoring the front side of the clamping device along the edge of the car door flange.

7. An automotive fixture comprising, in combination, a housing adapted to engage the outer surface of a car door flange, a bracket arm extending therefrom on which a car accessory is mounted; a hook-like yoke straddling the door flange and movable in relation to the housing, said yoke including a jaw portion reaching around the door edge into clamping position behind the door flange, and also including an operating portion disposed within the housing; and spaced screws disposed through non-threaded apertures provided in the housing and threadedly engaging the operating portion of the yoke, one end of each screw abutting the housing to restrain said screws against axial motion in relation to said housing when screwing into the yoke, thereby drawing and clamping the jaw portion and the housing to the door flange with a space-closing fit thereagainst.

8. An automotive fixture comprising, in combination, a housing and bracket arm extending centrally therefrom carrying an accessory, the housing being longer than its width, an interior elongated space provided within the housing from end to end thereof, the housing bottom acting as a jaw adapted to seat against the outside surface of a car door flange; a clamping yoke of hook-like form, about the same length as the elongated space, having an operating arm disposed therein, with a jaw spaced from and movable in relation to the housing bottom to grip the inside surface of the door flange received between said housing bottom and said relatively movable jaw; a non-threaded aperture provided through the housing at each end thereof and opening into the interior space, and a screw mounted in each aperture turning freely therein and bearing against a portion of the housing, the screws being threadedly engaged with each end of the operating arm, whereby tightening the screws draws the housing bottom and jaw toward each other for clamping the fixture on the door flange in a space-closing manner.

9. An automotive fixture comprising, in combination, a housing and bracket of integral one-piece formation, the housing being longer than its width, and the bracket extending outwardly from the center portion of said housing, with an accessory carried on the outer end of the bracket, its inner end widening and tapering into the housing; an interior elongated space provided within the housing from end to end thereof, the housing bottom acting as a jaw adapted to seat against the outside surface of a car door flange; a clamping member of yoke-like form in cross-section, about the same length as the elongated space, having an operating arm disposed therein, with a jaw spaced from and movable in relation to the housing bottom to grip the inside surface of the door flange received between said housing bottom and said relatively movable jaw; a non-threaded aperture provided through the housing on each side of the widening and tapering bracket and opening into the interior space, and a screw mounted in each aperture turning freely therein and bearing against a portion of the housing, the screws being threadedly engaged with each end of the operating arm on either side of the bracket, whereby tightening the screws draws the housing bottom and jaw toward each other for clamping the fixture on the door flange in a space-closing manner.

10. A bracket for attaching a mirror or the like to the door of an automobile, said bracket having an enlarged end with a flattened surface for contact with the outer surface of the door flange, and having an elongated recess adjacent said end, a U-shaped strap having one leg engaged in the recess and the other leg adapted closely to contact the inner surface of the door flange to grip it between said leg and said flattened surface, and means carried by said bracket and being operatively engageable with said strap to draw said last named leg towards said flattened surface.

11. A bracket for attaching a mirror or the like to the door of an automobile, said bracket having an enlarged end with a flattened surface for contact with the outer surface of the door flange, and having an elongated recess adjacent said end, a U-shaped strap having one leg engaged in the recess and the other leg adapted closely to contact the inner surface of the door flange to grip it between said leg and said flattened surface, and a plurality of screws carried by said casing and being operatively engageable with said strap to draw said last named leg towards said flattened surface.

12. In a device of the character described, the combination of a pressing member constituting an outer jaw; a housing member extending outwardly from and attached to said pressing member and defining therewith a chamber; a yoke-shaped clamping member having opposed inner and outer arms, straddling said pressing member, said outer arm being located inside said chamber and said inner arm being located outside said chamber and constituting an inner jaw in opposed relation to said outer jaw constituted by said pressing member; and adjusting screw means, including a rotatable member extending outwardly through said outer arm in said chamber and being accessible exteriorly of said chamber, operatively associated with said outer arm and said pressing member to subject said outer arm and pressing member to opposed forces serving to draw said inner jaw relative to said outer jaw when said rotatable member is rotated.

JOSEPH FISCHER.